(12) United States Patent
Ogura et al.

(10) Patent No.: US 7,029,794 B2
(45) Date of Patent: Apr. 18, 2006

(54) LITHIUM BATTERY AND ELECTRODE

(75) Inventors: Shizuo Ogura, Charlotte, NC (US); Hidehisa Mokudai, Kawasaki (JP); Makoto Murata, Tsurugashima (JP); Barrie Linton Davies, Waxhaw, NC (US)

(73) Assignee: Celanese Ventures GmbH (DE)

( * ) Notice: Subject to any disclaimer, the term of this patent is extended or adjusted under 35 U.S.C. 154(b) by 735 days.

(21) Appl. No.: 09/846,310

(22) Filed: May 1, 2001

(65) Prior Publication Data

US 2002/0182495 A1 Dec. 5, 2002

Related U.S. Application Data

(63) Continuation of application No. 09/647,188, filed on May 28, 2002, now abandoned, and a continuation-in-part of application No. 09/052,366, filed on Mar. 31, 1998, now abandoned.

(30) Foreign Application Priority Data

Apr. 28, 1998 (JP) .............................. 134, 351
Mar. 23, 1999 (EP) ................. PCT/EP99/01943

(51) Int. Cl.
*H01M 4/58* (2006.01)
*H01M 4/60* (2006.01)
*H01M 4/62* (2006.01)

(52) U.S. Cl. .................... 429/231.8; 429/213; 429/215; 429/231.8; 429/232; 429/209

(58) Field of Classification Search ............. 429/231.8, 429/213, 215, 209, 218.1, 232
See application file for complete search history.

(56) References Cited

U.S. PATENT DOCUMENTS

| 4,833,048 A | | 5/1989 | Dejonghe et al. | ........... 429/104 |
| 5,324,599 A | * | 6/1994 | Oyama et al. | .............. 429/312 |
| 5,441,831 A | | 8/1995 | Okamoto et al. | ........... 429/213 |
| 5,723,230 A | * | 3/1998 | Naoi et al. | .................. 429/104 |

FOREIGN PATENT DOCUMENTS

| EP | 0818839 | | 1/1998 |
| JP | A-5-175929 | | 7/1993 |
| JP | 2513418 | | 12/1995 |
| WO | WO 91/05089 | * | 4/1991 |
| WO | 95/07551 | | 3/1995 |
| WO | 97/45257 | | 12/1997 |

* cited by examiner

*Primary Examiner*—Patrick Ryan
*Assistant Examiner*—Angela J. Martin
(74) *Attorney, Agent, or Firm*—Connoly Bove Lodge & Hutz LLP (57) ABSTRACT

An electrode includes an electrically conductive matrix containing a disulfide group, wherein an S—S bond of the disulfide group is cleaved by electrochemical reduction and reformed by electrochemical oxidation. A plurality of carbon nanotubes are substantially disentangled and dispersed in the electrically conductive matrix. The electrode can be used as a cathode of a lithium battery. A method for producing disentangled carbon nanotubes includes the steps of: adding a plurality of aggregates of carbon nanotubes to a liquid; and providing sheer force (e.g. passing the liquid through a narrow gap at a high speed) onto the liquid for disentangling the aggregates of carbon nanotubes therein.

25 Claims, 4 Drawing Sheets

LITHIUM BATTERY AND ELECTRODE

This application is a continuation of application Ser. No. 09/647,188, which is now abandoned; and is a continuation of application Ser. No. 09/052,366, filed Mar. 31, 1998, which is now abandoned.

BACKGROUND OF THE INVENTION

1. Field of the Invention

The present invention relates to an electrode, a battery precursor and a lithium battery.

2. Description of Related Art

Batteries are a type of electrochemical cell containing a pair of electrodes and an electrolyte disposed between the electrodes. One of the electrodes is called a cathode wherein an active material is reduced during discharge. The other electrode is called an anode wherein another active material is oxidized during discharge. Secondary batteries refer to batteries capable of charging electricity after discharge.

Recently, intensive research has been conducted on lithium secondary batteries because of their high voltage and high energy density. Lithium batteries refers to batteries having an anode containing an active material for releasing lithium ions during discharge. The active material may be metallic lithium and an intercalated material being capable of incorporating lithium between layers.

Particular attention has been paid to an electrode material for the cathode of the lithium secondary battery. For example, U.S. Pat. No. 4,833,048 discloses a cathode containing a disulfide compound for improving an energy density. This compound is represented by R—S—S—R wherein R is an aliphatic or an aromatic organic group and S is a sulfur atom. An S—S bond is cleaved by the electrolytic reduction in an electrolytic cell containing cation of $M^+$ to form a salt represented by $R-S^- \cdot M^+$. This salt returns to the R—S—S—R by the electrolytic oxidation. U.S. Pat. No. 4,833,048 discloses a rechargeable battery obtained by combining a disulfide compound with metal M which supplies and captures the cations ($M^+$). The rechargeable battery provides an improved energy density of at least 150 Wh/kg. The entire disclosure of U.S. Pat. No. 4,833,048 is incorporated herein as reference.

However, as the inventors of U.S. Pat. No. 4,833,048 reported in J. Electrochem. Soc., Vol. 136, No. 9, pp. 2570 to 2575 (1989), the difference between the oxidation potential and the reduction potential of the disulfide compound is very large. For example, when $[(C_2H_5)_2NCSS-]_2$ is electrolyzed, the oxidation potential differs from the reduction potential by 1 V or more. According to the theory of electrochemical reaction, the electron transfer of the disulfide compound proceeds extremely slowly at room temperature. Therefore, it is rather difficult to obtain a rechargeable battery providing a higher current output of 1 $mA/cm^2$ or more at room temperature. The operation of a battery comprising an electrode of disulfide compound is limited to high temperatures in the range of 100° to 200° C., where the electron transfer can proceed faster.

U.S. Pat. No. 5,324,599 discloses a cathode for a lithium secondary battery containing the disulfide compound and a conductive polymer. The conductive polymer allows to operate the battery in much lower temperatures such as room temperature. The entire disclosure of U.S. Pat. No. 5,324,599 is incorporated herein as reference.

Japanese Patent No. 2,513,418, which corresponds to JP-A-5-175929, discloses a cathode containing carbon nanotubes. The carbon nanotubes are obtained by electric discharge between a pair of carbon rods. Japanese Patent No. 2,513,418 does not teach the disulfide compound. The entire disclosure of Japanese Patent No. 2513418 is incorporated herein as reference.

WO 95/07551 discloses an electrode, which may be used for a lithium secondary battery, containing carbon nanotubes. The carbon nanotubes are obtained by catalytic reactions. The document further discloses aggregates of carbon nanotubes disentangled by an ultrasonic homogenizer. The entire disclosure of WO 95/07551 is incorporated herein as reference.

SUMMARY OF THE INVENTION

According to the first aspect of the present invention, there is provided an electrode comprising: an electrically conductive matrix containing a disulfide group, wherein an S—S bond of the disulfide group is cleaved by electrochemical reduction and reformed by electrochemical oxidation; and a plurality of carbon nanotubes being substantially disentangled and dispersed in the electrically conductive matrix.

Preferably, the electrode is substantially free of an aggregate of the carbon nanotubes.

Preferably, the electrically conductive matrix may contain an electrically conductive polymer and an organic compound having the disulfide group. Alternatively, the electrically conductive matrix may contain an electrically conductive polymer having the mercapto group which is capable of forming disulfide group.

According to the second aspect of the present invention, there is provided a method for producing disentangled carbon nanotubes, said method comprising the steps of: adding a plurality of aggregates of carbon nanotubes to a liquid; and providing sheer force onto the liquid for disentangling the aggregates of carbon nanotubes therein.

According to the third aspect of the present invention, there is provided a lithium battery, comprising: a cathode having: an electrically conductive matrix; and a plurality of carbon nanotubes being substantially disentangled and dispersed in the electrically conductive matrix; an anode having an active material for releasing lithium ions; and an electrolyte being disposed between the cathode and the anode.

DESCRIPTION OF THE PREFERRED EMBODIMENTS

An electrode of the present invention includes an electrically conductive matrix containing a disulfide group. In one embodiment, the electrically conductive matrix contains an electrically conductive polymer and an organic compound having the disulfide group. In another embodiment, the electrically conductive matrix contains an electrically conductive polymer having the mercapto group.

The disulfide group is responsible for the electrochemical reactions at the electrode. Namely, an S—S bond of the disulfide group is cleaved by electrochemical reduction and reformed by electrochemical oxidation. When the electrode is used as a cathode for a lithium battery, the electrochemical reactions of the cathode and an anode are shown in the formula as follows:

wherein R—S—S—R is an organic compound having the disulfide group, R is an aliphatic or an aromatic organic group, and S is a sulfur atom.

In this example, metallic lithium is used as the anode although the anode of a lithium battery is not limited to metallic lithium. When the lithium battery discharges, electrochemical reduction occurs at the cathode, and the organic compound containing the disulfide group reacts with lithium ions to cleave an S—S bond of the disulfide group thereof and to form a salt represented by R—S$^-$—Li$^+$. During the discharge, electrochemical oxidation occurs at the anode, and a metallic lithium is oxidized to a lithium ion.

When the lithium battery is charged, the reactions proceed in reverse directions. Specifically, electrochemical oxidation occurs at the cathode, and the salt returns to the R—S—S—R; electrochemical reduction occurs at the anode, and the lithium ion returns to the metallic lithium.

Examples of the organic compound having the disulfide group are shown in Tables 1 and 2.

| Name | Formula |
|---|---|
| 2-mercaptoethyl ether | (—SCH$_2$CH$_2$OCH$_2$CH$_2$S—)$_n$ |
| dimercapto dithiazole | ![structure] |
| dimethyl ethylenediamine | ![structure] |
| ethylenediamine | ![structure] |
| polyethylene imine derivative | ![structure] |

-continued

| Name | Formula |
|---|---|
| trithiocyanuric acid | ![structure] |
| piperazine | ![structure] |
| 2,4-dithiopyrimidine | ![structure] |
| 1,2-ethanedithiiol | (—SCH$_2$—CH$_2$S—)$_n$ |
| 2-mercaptoethyl sulfide | (—SCH$_2$CH$_2$SCH$_2$CH$_2$S—)$_n$ |

Preferably, the organic compound contains a 5 to 7 membered, heterocyclic ring containing 1 to 3 heteroatoms consisting of a nitrogen atom and a sulfur atom. The heterocyclic ring may be saturated or unsaturated. Preferably, the heterocyclic ring is saturated. Further preferably, the organic compound contains a thiadiazole ring and particularly 1,3,4-thiadiazole ring. For example, a dimer of 2,5-dimercapto-1,3,4-thiadiazole may be used as the organic compound containing the disulfide group. The electrically conductive polymer in use with the organic compound containing the disulfide group preferably has a π electron conjugated structure. Examples of such electrically conductive polymer include polymers obtained by polymerizing thiophene, pyrrole, aniline, furan, benzene, or the like. More specifically, examples of the polymers include polyaniline, polypyrrole, polythiophene, and polyacene. These π electron conjugated electrically conductive polymers are reduced and oxidized with a high reversibility in 0 to ±1.0 V versus Ag/AgCl electrode. Electrically conductive polymers which are doped with anions such as iodine exhibit excellent properties.

The electrically conductive matrix may have a porous fibril structure. For example, electrically conductive polymers may have a porous fibril structure, which depends on the polymerization conditions. In other words, electrically conductive polymers may have a form of a plurality of fibrils defining pores therebetween. The disulfide compound may be held in the pores formed by the fibrils. Such an electrically conductive polymer having the porous fibril structure may be obtained by polymerization at the electrode.

Alternatively, the electrically conductive matrix may be continuous, being substantially free of pores. Such an electrically conductive matrix may be obtained by a standard chemical polymerization reaction.

Among the π electron conjugated electrically conductive polymers, a polymer represented by a formula:

wherein Ar is aryl, and n is an integer is preferably used. Aryl preferably has carbon atoms ranging from 6 to 20, and further preferably from 6 to 10. Aryl may be phenyl, naphthalenyl, indenyl and the like. Polyaniline wherein aryl is phenyl is preferred.

The matrix containing the combination of the above-mentioned disulfide compound and an electrically conductive polymer may be produced by a well known method such as mixing, impregnating, or coating. For example, a fibril layer of the electrically conductive polymer is formed on a stainless steel substrate by electrolytic polymerization, after which a salt in the disulfide compound is impregnated in the fibril layer, thereby obtaining a composite electrode. Alternatively, the disulfide compound particles are dispersed in a solvent in which the electrically conductive polymer is dissolved, and after that, the solvent is removed, whereby a layer of the electrically conductive polymer is formed on the surface of the disulfide compound particle. Furthermore, the electrically conductive polymer particles obtained by the chemical polymerization or electrolytic polymerization can be mixed with the disulfide compound particles.

As another method, the electrode material of the present invention can be obtained by polymerizing a monomer capable of forming a $\pi$ electron conjugated electrically conductive polymer in the presence of the compound containing a disulfide group therein and having a conformation which enables a reversible cleavage of an S—S bond of the disulfide group in its molecule (e.g., 1,8-disulfide naphthalene). For example, when aniline is subjected to the electrolytic polymerization on an electrode in the presence of 1,8-disulfide naphthalene, a composite film of polyaniline and 1,8-disulfide naphthalene is formed.

Alternatively, as another method, a dimer of a compound having a mercapto group can be used instead of a compound having a conformation which enables a reversible cleavage of an S—S bond in its molecule. For example, a dimer of 2-mercapto-2-thiazoline is obtained, and a polyaniline-2-mercapto-2-thiazoline dimer composite film can be formed by using this dimer instead of 1,8-disulfide naphthalene. In any of the above cases, it is preferred that the polymerization is conducted under the conditions that a film having a fibril structure can be formed. In these methods, the compound in which a mercapto group is protected is used, so that the electrically conductive polymer can be prepared without any inhibition. In the composite material thus obtained, the disulfide compound and the electrically conductive polymer forms a composite, thereby preventing the disulfide compound from leaking out of the composite film into the electrolyte during its use as a cathode of a rechargeable battery.

In the electrode of the present invention, a conductive polymer containing a mercapto group may be used. The conductive polymer having a mercapto group can be obtained, for example, by (1) introducing a mercapto group into a $\pi$ electron conjugated conductive polymer; or (2) electrolytic polymerization of a monomer having a mercapto group and being capable of forming a $\pi$ electron conjugated conductive polymer.

As the $\pi$ electron conjugated conductive polymer in this method (1), a conductive polymer or derivatives thereof used for the first electrode material can be used. For example, halogenated pyrrole is subjected to the electrolytic polymerization to from a thin film of polyhalopyrrole on an electrode. At this time, it is preferred that the polymerization is conducted in the same way as in the case of the first electrode material under the conditions that a thin film having a fibril structure is formed. Then, a halogen group is converted into a mercapto group by thiourea to form polypyrrole having a mercapto group. After that, a compound having a mercapto group is reacted with the polypyrrole having a mercapto group to form polypyrrole having a disulfide group. As the compound having a mercapto group, the disulfide compound (which is a reduced form and has an SH group) used for the first electrode material, for example, 2,5-dimercapto-1,3,4-thiadiazole is preferably used. The conductive polymer in a thin film shape having a disulfide group so obtained can be used as a reversible electrode.

As the monomer capable of forming a $\pi$ electron conjugated conductive polymer in this method (2), the monomer (e.g., thiophene and pyrrole) in which a disulfide group is introduced and capable of forming a conductive polymer used in the first electrode material can be used. A conductive polymer having a having a mercapto group can be obtained by polymerizing this monomer. For example, a thiophene derivative having a disulfide group can be obtained by reacting thiophene having a mercapto group with the disulfide compound which is a reduced form and has an SH group. The thiophene derivative having a disulfide group thus obtained (e.g., 2,5-dimercapto-1,3,4-thiaziazole) is used for the first electrode. This thiophene derivative is subjected to the electrolytic polymerization on an electrode, whereby a conductive polymer film having a disulfide group can be formed. It is preferred that the polymerization is conducted under such conditions that a film having a fibril structure is formed. The conductive polymer film thus formed functions as a reversible electrode.

In the electrode of the present invention, a plurality of carbon nanotubes are substantially disentangled and dispersed in the electrically conductive matrix. The carbon nanotubes conducts electricity along the axial direction thereof, thereby decreasing electric resistance of the matrix. Typically, the carbon nanotubes have less resistance and conduct more electricity than the electrically conductive polymer. Moreover, the presence of the carbon nanotubes serving as a filler increases the mechanical strength of the matrix.

Disentangled carbon nanotubes increase electric conductivity more than aggregates of carbon nanotubes. Disentangled carbon nanotubes facilitate conducing electrons in its axial direction. Preferably, a plurality of carbon nanotubes contact each other, thereby facilitating electric conductivity in the network of disentangled carbon nanotubes. In contrast, aggregates of carbon nanotubes may not efficiently conduct electrons beyond the aggregates.

Carbon nanotubes are graphitic fibers having a microscopic tubular structure. While carbon nanotubes are graphitic, geometric constraints force some differences from pure graphite. Like graphite, carbon nanotubes are composed of parallel layers of carbon but in the form of a series of concentric tubes disposed about the longitudinal axis of the fibers rather than as multi-layers of flat graphite sheets. Thus, because of the geometric constraints in the narrow diameter of the carbon nanotubes, the graphite layers cannot line up precisely with respect to the layers below as flat graphite sheets can.

Ideally, a carbon nanotube consists of one or more seamless cylindrical shells of graphitic sheets. In other words, each shell is made of $Sp^2$ (trivalent) carbon atoms that from a hexagonal network without any edges. A carbon nanotube can be thought of as a tubular microcrystal of graphite. The tube is typically closed at each end by the introduction of pentagons in the hexagonal network. Multishell nanotubes may have interlayer spacing of about 0.34 nanometers and typical of turbostratic graphite, in which the position of each layer relative to the next is not correlated. A given nanotube will be composed of shells having different helicities. In fact, the different degrees of helicity in each shell are necessary to obtain the best fit between the successive shells in a tube and minimize the interlayer distance.

The carbon nanotubes may be catalytically prepared. The process provides aggregates uncontaminated with amorphous carbon allowing carbon nanotubes to be fashioned into a product with only minimal processing. The carbon nanotubes are grown by contacting catalyst particles with gaseous hydrocarbon in a hydrogen rich atmosphere. Their diameters may be average 7 to 12 nanometers. Lengths may be several micrometers. They are hollow tubes with wall thicknesses of 2 to 5 nanometers. These walls are essentially concentric tubes of individual graphite layers rolled into cylinders. At intervals along the length of a fiber some of the inner layers may curve into hemispherical septa spanning the hollow interior. Near these, the walls may for a short distance change into nested cones. These reflect changes in the catalysticarbon interface during growth of the fibril. Unlike other catalytic vapor grown carbon fibers they are free of less organized pyrolytic carbon on their surfaces.

Carbon nanotubes may be prepared by condensation of carbon vapor in an arc. The carbon vapor may be produced by irradiating laser onto a carbon—nickel—cobalt mixture at 1200° C. as reported in Science Vol. 273, Jul. 26, 1996 page 483. They usually have a wider distribution of diameters from single layer walls to many tens of layers. Some have only concentric cylinders (or polygonal cross sections). Others also have septa and nested cones. Less organized carbon is deposited at the same time in the form of polygons or turbostratic carbon some of which may coat the carbon nanotubes.

The carbon nanotubes prepared by condensation of carbon vapor in an arc are commercially available from Materials & Electrochemical Research Corporation and from its distributor of Science Laboratory Incorporation at Matsudo, Chiba, Japan. The carbon nanotubes from Materials & Electrochemical Research Corporation may have average lengths ranging from 0.199 μm to 2.747 μm, and average diameters ranging from 18.5 nm to 38.7 nm. The carbon nanotubes contain some non-tubular carbon particles as well. In one sample, carbon nanotubes have length of 0.843±0.185 μm, diameter of 19.6±3.7 nm, and an aspect ratio of 47.2±11.7. Such carbon nanotubes may be used in the present invention.

As would be expected from their structure and similarity to graphite, carbon nanotubes are conductive. While the conductivity of individual carbon nanotubes is difficult to measure, a recent attempt has yielded an estimated resistivity value of 9.5 (±4.5) mΩcm, a resistivity slightly higher than typically measured for graphitized carbon.

The diameter of the carbon nanotubes that are used in this invention may be 3.5 to 200 nm, and, preferably, 5 to 30 nm and their length should be at least greater than 5 times their diameter, and preferably, $10^2$ to $10^4$ times their diameter.

When the diameter of the carbon nanotubes exceeds 200 nm, their effect in providing conductivity is decreased. When it is less than 3.5 nm, the carbon nanotubes may scatter and become difficult to handle. When the length of the carbon nanotubes is less than 5 times their diameter, conductivity is reduced. The aspect ratio of each of the carbon nanotubes may ordinarily be greater than 5, preferably, greater than 100, and, more preferably, greater than 1000.

The carbon nanotubes that are used in this invention can be obtained, for example, using carbon nanotubes manufactured by the method described in Japanese Patent Application No. 2-503334 [1990] as the raw material. This material may be use in unaltered from or be subjected to chemical or physical treatment, after which it is subjected to pulverization treatment. The chemical or physical treatment may be carried out before or after the pulverization treatment.

Examples of physical or chemical treatments of the carbon nanotubes include oxidation with nitric acid, oxidation with ozone, organic plasma treatment, coating with resins such as epoxy resins and treatment with coupling agents such as organic silicon and titanium compounds. The physical treatment further includes providing a sheer force onto a liquid containing aggregate of carbon nanotubes, thereby disentangling the aggregate.

When the electrolytic reduction is conducted in the presence of metal ions or protons at the electrode made of the present invention, the S—S bond of the disulfide group of the electrode material is cleaved to form a sulfur-metal ion bond or a sulfur-proton bond. The resulting electrode is subjected to electrolytic oxidation, and the sulfur-metal ion bond or sulfur-proton bond returns to the S—S bond. The electrolytic oxidation and the electrolytic reduction involves electron transfers, which are facilitated by carbon nanotubes in the electrically conductive matrix.

Examples of the metal ion include an alkali metal ion and an alkaline earth metal ion. In the case where the electrode made of the electrode material of the present invention is used as a cathode, and a lithium ion is used as the alkali metal ion; when an electrode made of lithium or a lithium alloy such as lithium—aluminium is used as an anode which supplies and captures lithium ions, and an electrolyte which can transmit lithium ions is used, a battery having a voltage of 3 to 4 V can be obtained. When an electrode made of a hydrogen storage alloy such as LaNi5 is used as an anode which supplies and captures protons, and an electrolyte which can conduct protons is used, a battery having a voltage of 1 to 2 V can be obtained.

In the combination of the disulfide compound and the π electron conjugated electrically conductive polymer, the π electron conjugated electrically conductive polymer functions as an electrode catalyst for the electrolytic oxidation and reduction of the disulfide compound. In the case of the π electron conjugated electrically conductive polymer having a disulfide group, when the disulfide group is subjected to the electrolytic oxidation and reduction, the electronic structure given by the conjugated π electron functions as an electrode catalyst. In the case of the disulfide compound alone, the difference between the oxidation potential and the reduction potential is 1 V or more. However, in the case of using a combination of the π electron conjugated electrically conductive polymer and the disulfide compound, or the electrically conductive polymer having a disulfide group, the difference between the oxidation potential and the reduction potential is reduced to 0.1 V or less. In the disulfide compound which is combined with the π electron conjugated electrically conductive polymer or which is introduced into such a polymer, the electrode reaction is promoted and a higher current density at room temperature is obtained on electrolysis, i.e., on charging or discharging. When the electrode material of the present invention is subjected to electrolytic oxidation, the π electron conjugated electrically conductive polymer (a conjugated polymer portion in the case of the electrically conductive polymer having a disulfide group) is oxidized at first and the resuling oxidized form of the polymer oxidizes the reduced type of the disulfide compound (an SH or S-metal ion portion in the case of electrically conductive polymer having a disulfide group). Thus, the oxidized form of the π electron conjugated polymer returns to the reduced form and an oxidized form of the disulfide compound is generated (i.e., a disulfide group is formed). When the electrolytic reduction is first conducted, the electrically conductive polymer is reduced and the resulting reduced form reduces the oxidized form of the disulfide compound. Thus, the reduced form of the π electron conjugated polymer returns to the oxidized form and the disulfide compound becomes a reduced form. The introduction of the electrode catalyst into the disulfide compound electrode is disclosed in U.S. Pat. No. 4,833,048 or J. Electrochem. Soc., Vol. 136, pp. 2570–2575 (1989). However, as the electrode catalyst, only the organic metallic compound is disclosed. The effects of the electrode catalyst are not described in detail. As described above, the π electron conjugated polymer or the conjugated polymer portion has a function for promoting the movement of the electrons in the oxidation-reduction reaction. It functions as a catalyst in the oxidation-reduction of disulfide, reducing the activation energy of the reaction. In addition to that, the π electron conjugated polymer or the conjugated polymer portion increases an effective reaction area between the electrolyte and the electrodes.

The lithium battery of the present invention includes the cathode which the aforementioned electrode serves as.

An anode of the lithium battery of the present invention is not limited. The anode may contain a carbon material, and the carbon material includes natural graphite, artificial graphite, amorphous carbon, fibrous carbon, powdery carbon, petroleum pitch carbon, and coal coke carbon. It is preferred that these carbon materials are particles or fibers having a diameter of 0.01 to 10 micrometers and a length of from several micrometers to several millimeters.

An anode of a lithium battery may contain aluminum or an alloy containing aluminium. Example of the aluminium or alloys thereof includes Al, Al—Fe, Al—Si, Al—Zn, Al—Li, and Al—Zn—Si. It is preferred that the aluminum or alloys thereof are flaky powders obtained by rapid cooling, or spherical or amorphous powders obtained by mechanical crushing in the air or an inactive gas such as nitrogen. The particle size is preferably 1 μm to 100 μm.

The mixing ratio of the carbon material to the aluminum or aluminum alloy may be 0.01 to 5 parts by weight, preferably 0.05 to 0.5 parts by weight based on one part by weight of the aluminium or aluminium alloy.

Alternatively, the anode may be a so-called rocking chair cell. Intercalated compounds such as graphite may intercalate the lithium therebetween.

The electrolyte of the lithium secondary battery of the present invention is not limited as long as the electrolyte conducts lithium ions. The electrolyte may be a liquid electrolyte, a solid electrolyte and a gel electrolyte. Preferably, the electrolyte is the solid or gel electrolyte, and further preferably the electrolyte maintain a solid state or a gel state at temperatures ranging from −20° to 60° C. Alternatively, a porous separator defining pores and being made of a polymer material may be disposed between the cathode and the anode, and the liquid electrolyte may be present in the pores thereof. The liquid electrolyte man contain a lithium salt dissolved therein. The solid electrolyte may contain a lithium salt and preferably contain a polymer containing the lithium salt. Examples of the salt containing lithium include LiI, $Li_3N$—LiI—$B_2O_3$, LiI·$H_2O$, and Li—β—$Al_2O_3$.

For example, the solid electrolyte may be a composite of polyethylene oxide and a lithium salt dissolved therein. In addition, the solid electrolyte may be a poly(acrylonitrile) film comprising propylene carbonate and $LiClO_4$ dissolved in the propylene carbonate.

The anode and the cathode may contain the component for the electrolyte. For example, a composition for the solid electrolyte may comprise: a polyether obtained by adding ethylene oxide and butylene oxide to a polyamine; an ion-exchangeable compound having a layered crystal structure; and a lithium salt, and such composition may be mixed added to a composition for the anode or the cathode. The polyether can be obtained by the addition reaction of ethylene oxide and butylene oxide with polyamine using an alkali catalyst at 100° C. to 180° C. under an atmospheric pressure of 1 to 10 atm. As the polyamine which is a component of the above polyether, polyethylenimine, polyalkylenepolyamine or derivatives thereof can be used. Examples of the polyalkylenepoly-amine include diethylenctriamine, triethylenetetramine, hexamethylenetctramine, and dipropylenetriamine. The additional number of the total moles of ethylene oxide and butylene oxide is 2 to 150 moles per one active hydrogen of the polyamine. The molar ratio of ethylene oxide (EO) to butylene oxide (BO) is 90/120 to 10/190 (=EO/BO). The average molecular weight of the poly ether thus obtained is in the range of 1,000 to 5,000,000. It is preferred that the polyether is contained in the solid electrode composition in an amount of 0.5 to 20% by weight. The polyether of the solid electrolyte serves as a surfactant so that this composition is uniformly dispersed.

Examples of the ion-exchangeable compound having a layered crystal structure include clay minerals including silicate such as montmorillonite, hectorite, saponite, and smectite, phosphoric esters such as zirconium phosphate and titanium phosphate, vanadic acid, antimonic acid, tungstic acid; or substances obtained by modifying these acids with organic cations such as quaternary ammonium salts or with organic polar compounds such as ethylene oxide and butylene oxide.

Figure 4:
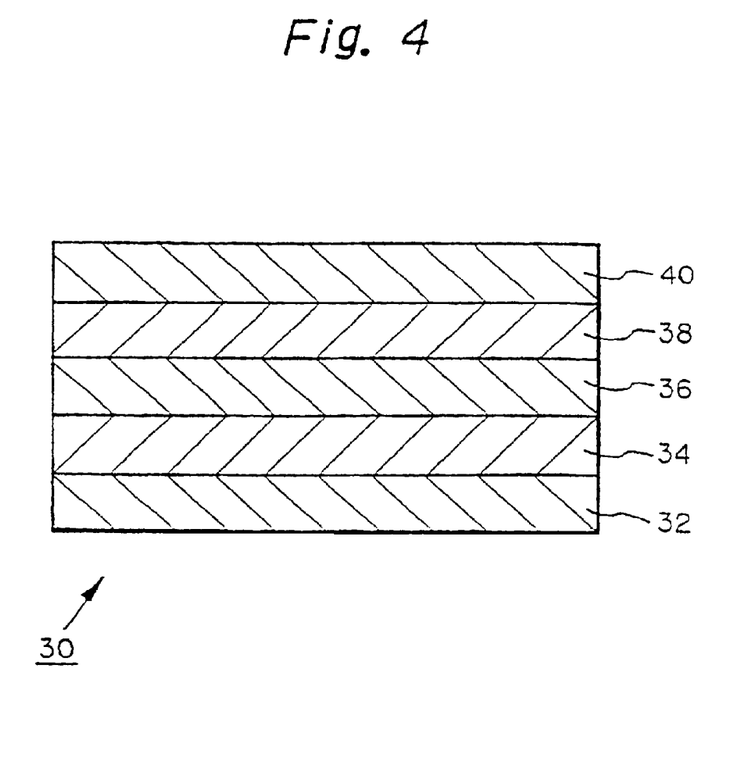
FIG. 4 is a cross section of a laminated structure used for a lithium battery.

FIG. 4 is a cross section of a laminated structure used for a lithium battery. The structure 30 has a cathode 34, an anode 38 having an active material for releasing lithium ions; and an electrolyte 36 being disposed between the cathode 34 and the anode 38. The structure has a cathode current collector 32 contacting with the cathode 34; and an anode current collector 40 contacting with the anode 38. In the present invention, the cathode 34 has an electrically conductive matrix containing a disulfide group, wherein an S—S bond of the disulfide group is cleaved by electrochemical reduction and reformed by electrochemical oxidation; and a plurality of carbon nanotubes being dispersed in the electrically conductive matrix. The cathode current collector 32, the cathode 34, the electrolyte 36, the anode 38, and the anode current collector 40 have a layered structure and are laminated each other in this order. The electrolyte 36 may have at least one of a solid electrolyte and gel electrolyte.

When the lithium secondary battery of the present invention is charged, Li is liberated from an S—Li bond of the cathode and an S—S bond is formed. On the surface of the anode or inside the anode (when the anode component and the electrolyte component are mixed), lithium is uniformly deposited. Since lithium is directly deposited from the electrolyte, impurities such as oxygen are not likely to contaminate. Accordingly, even when the charging and discharging are repeated, current is not likely to concentrate, whereby any short-circuit in the battery can be effectively prevented. Lithium generated during charging (electrolysis) and electrolyte are in a good contact with each other, so that the polarization during discharging can be decreased, and a higher current can be realized. As described above, when the electrolyte is mixed in the cathode and/or the anode, especially effective results can be obtained. In this case, it is particularly effective that compounds having lithium salts, polyether, and a layered crystal structure are used as the electrolyte.

The lithium secondary battery of the present invention can be prepared by the following method also. Firstly, aggregates of carbon nanotubes are obtained by a conventional method.

Disentangled carbon nanotubes may be obtained by a process including the steps of: adding a plurality of aggregates of carbon nanotubes to a liquid; and providing sheer force onto the liquid for disentangling the aggregates of carbon nanotubes therein.

The liquid may have a viscosity at 25° C. of not less than 0.8 centipoise and preferably not less than 1.0 centipoise since the viscose liquid facilitates to apply sheer force by mechanical process. The viscosity of some liquids are summarized in Table 3.

TABLE 3

| liquid | viscosity at 25° C. in centipoise |
| --- | --- |
| N-methyl-2-pyrrolidone | 1.67 |
| 2-propanol | 1.77 |
| methanol | 0.545 |

The liquid may be an organic solvent or water. The organic solvent is preferably polar. Examples of the organic solvent includes N-methyl-2-pyrrolidone. When water is used, preferably, water contains a surfactant. The sheer force may be provided by a mechanical process, and the liquid containing the aggregates may passed through a narrow gap at a high speed.

Figure 1:
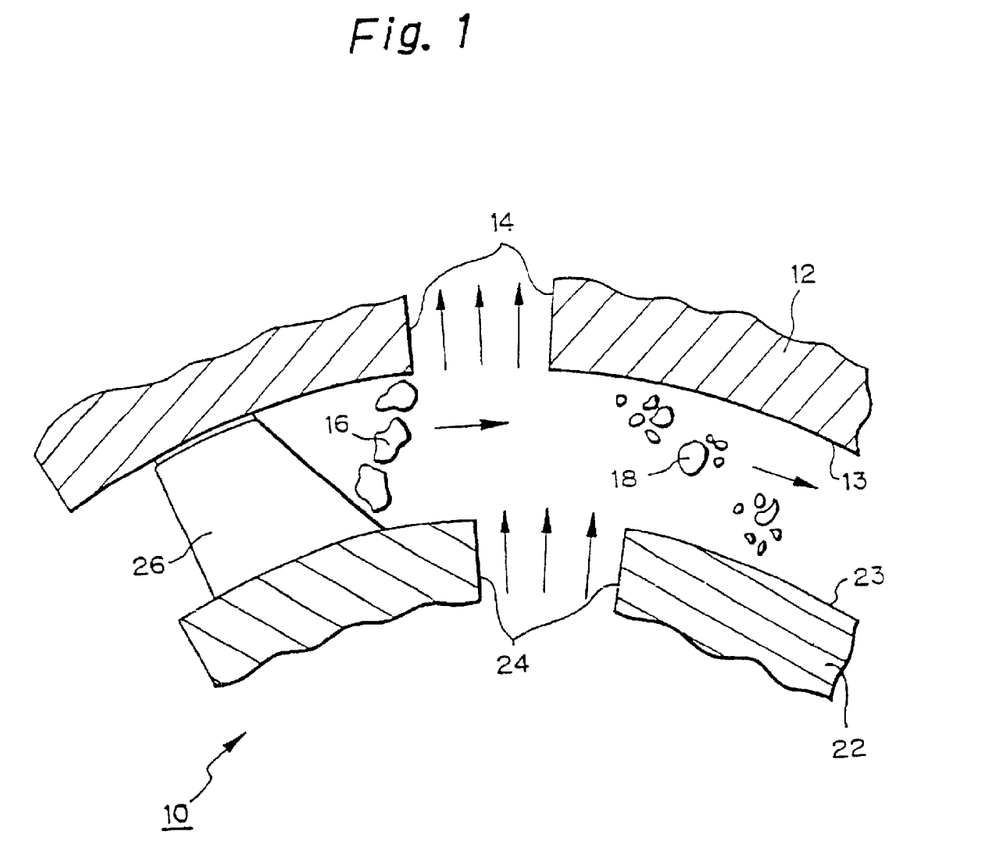
FIG. 1 is a cross section of a part of a homogenizer.

For example, a homogenizer may be used to apply the sheer force. In FIG. 1, the homogenizer 10 has a stator 12 which has a radially inner surface 13; and a rotor 22 which has a radially outer surface 23. The stator 12 and the rotor 22 shares an axis. The radially inner surface 13 of the stator 12 and the radially outer surface 23 of the rotor 22 define a narrow gap having an arc or circular configuration therebetween. A blade 26 is fixed to the rotor 22 and being disposed in the narrow gap. As the rotor 22 rotates, the blade 26 rotates along the narrow gap.

The stator 12 is formed of at least one hole 14 in radial directions, allowing a liquid passing therethrough. Similarly, the rotor 22 is formed of at least one hole 24 in radial directions, allowing a liquid passing therethrough. Typically, the liquid passes through the hole 24 in radially outward directions and subsequently through the hole 14 in radially outward directions.

When the liquid has a plurality of aggregates 16, the aggregates 16 are forced to pass through the narrow gap by the blade 26 so that sheer force is applied thereonto. The aggregate 16 is disentangled gradually and becomes smaller particles 18.

Alternatively, the ultrasonic generator may apply ultrasonic waves onto the liquid containing the aggregates, thereby disentangling the aggregates therein.

Preferably, a mixture containing disentangled carbon nanotubes and a liquid medium is mixed with the organic compound containing the disulfide group and the electrically conductive polymer. Alternatively, the mixture containing disentangled carbon nanotubes and the liquid medium may be mixed with the electrically conductive polymer containing the mercapto group. The liquid medium may be the same as or different from the liquid used for disentangling aggregates of carbon nanotubes.

A battery precursor having the current collector and the cathode film laminated thereon can be prepared by coating the composition for the cathode film onto the current collector, which may be metallic foil.

The structure 30 of FIG. 4 may be made from the battery precursor. The electrolyte 36, the anode 38 and the anode current collector 40 may be laminated onto the battery precursor.

A plurality of the structures 30 may be laminated each other and packed in a housing to produce a lithium battery. Alternatively, a plurality of the structures 30 may be rolled to a generally cylindrically configuration, and then packed in a housing. The lithium secondary battery of the present invention can be prepared by the following method also. Respective compositions of the cathode, the anode, and the electrolyte are molded into films. The composition of the cathode contains the carbon nanotubes. The cathode film, electrolyte film, and anode film are laminated in this order and pressed together, thereby obtaining a unit cell. If required, electrically conductive foils, serving as current collectors, and leads are attached to the cathode and the anode of this unit cell, and the assembly is packaged, thereby producing a lithium secondary battery. Preferably, the electrolyte component is admixed in the cathode and/or the anode.

EXAMPLE

Example 1

Carbon Nanotubes

Firstly, aggregates of carbon nanotubes were disentangled. The aggregates of carbon nanotubes were added to 1-methyl-2-pyrrolidone to give a mixture containing 1 percent by weight of the carbon nanotubes. The mixture was added to a homogenizer under a trade name of ULTRA TALUX T-25 from IKA Japan Company Limited in Nakayama-ku, Yokohama, Japan. The homogenizer applied sheer force to the mixture, thereby disentangling the aggregate. The homogenizer has a structure of FIG. 1. In the homogenizer, the rotor may rotate 8,000 to 24,000 round per minute.

Figure 2:
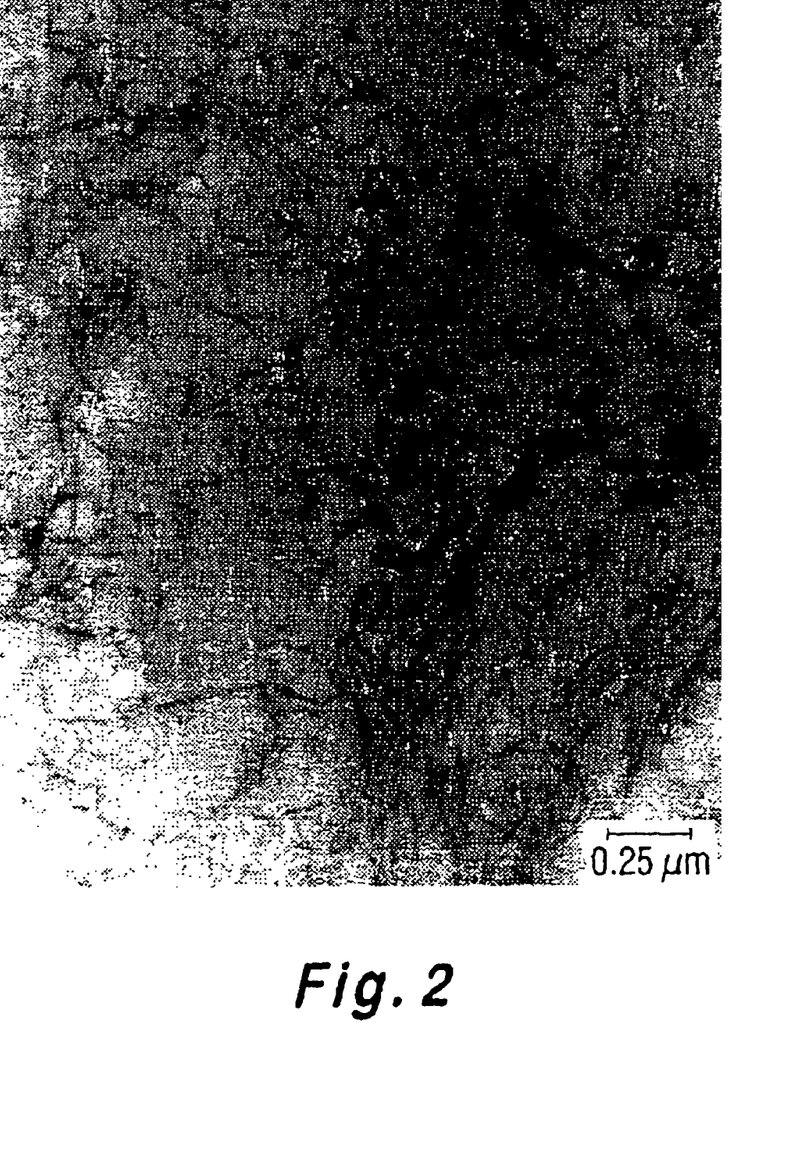
FIG. 2 is a photograph of a poly(methylmethacrylate) film containing disentangled carbon nanotubes observed by transmission electron microscopy.

Secondly, we confirmed that aggregates of carbon nanotubes were disentangled by following procedures, which are not necessary in producing an electrode including the disentangled carbon nanotubes. To the liquid mixture thus obtained, which contains one part by weight of carbon nanotubes, was added 19 parts by weight of polymethylmethacrylate serving as a binder and further N-methyl-2-pyrrolidone for dilution. The polymethylmethacrylate, which is referred to PMMA hereinafter, has a weight average molecular weight of 996,000 and is commercially available from Aldrich. The liquid mixture was casted onto a glass substrate, and the glass substrate was placed in a vacuum oven for evaporating the solvent, thereby producing a PMMA film containing 5 percent by weight of carbon nanotubes. We observed the PMMA film by transmission electron microscopy. FIG. 2 is a photograph of the result. Fibrils, which correspond to carbon nanotubes, are disentangled and dispersed in the PMMA matrix.

Figure 3:
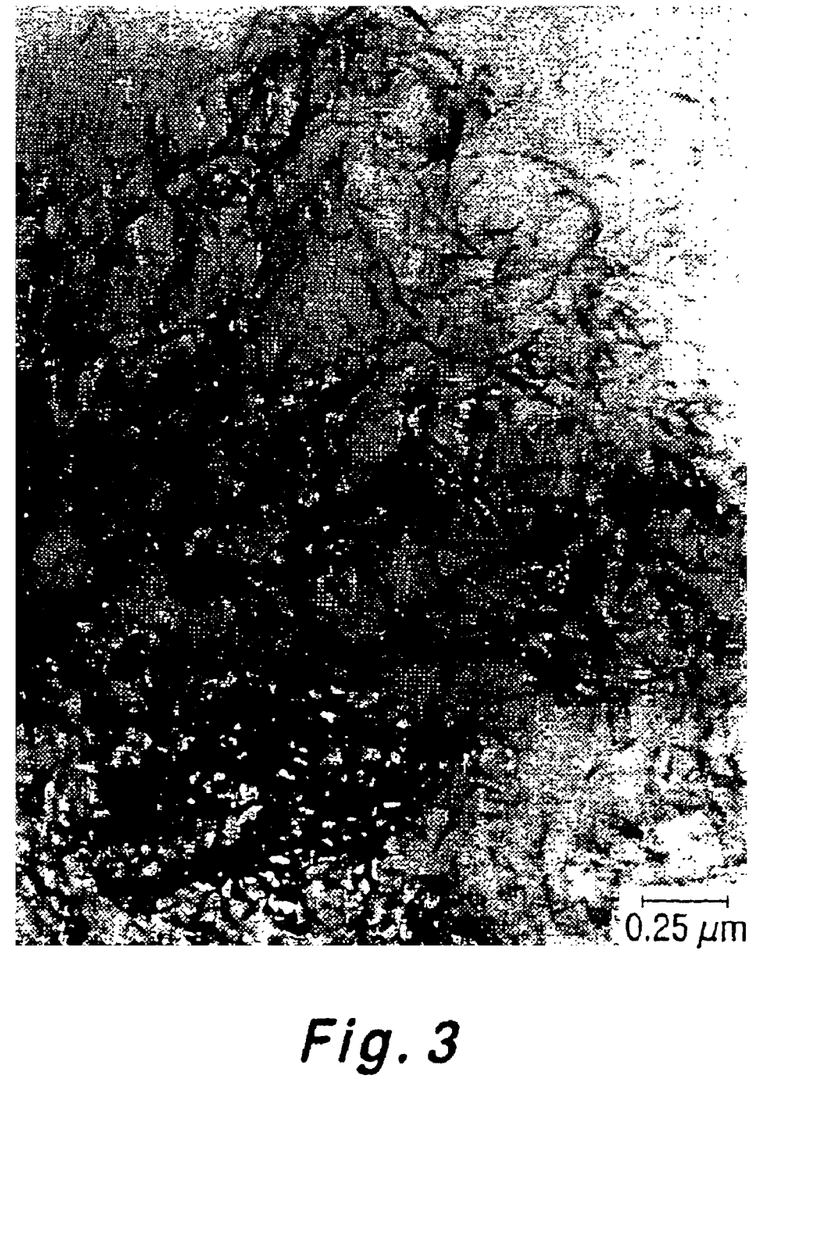
FIG. 3 is a photograph of a poly(methylmethacrylate) film containing aggregates of carbon nanotubes observed by transmission electron microscopy.

As a comparative example, we did not apply sheer force to the liquid mixture containing aggregates of the carbon nanotubes. Specifically, the liquid mixture containing N-methyl-2-pyrrolidone and 1 percent by weight of carbon nanotubes was mixed by a magnetic stirrer overnight. Another PMMA film was produced in the same manner as mentioned above using the resultant liquid mixture, and the PMMA film was observed by transmission electron microscopy. FIG. 3 is a photograph of the result. A plurality of aggregates of the carbon nanotubes are present in the matrix.

Battery Precursor 1.8 gram of a powder of 2,5-dimercapto-1,3,4-thiadiazole was mixed with 1.2 gram of polyaniline by a ball mill. To 2.5 gram of the powder mixture was added 11.1 gram of a liquid mixture containing 2 percent by weight of disentangled carbon nanotubes in N-methyl-2-pyrrolidone, and the resultant mixture was mixed in a mortar to produce an ink The ink was coated onto a copper foil having a thickness of 35 micrometers using a doctor blade having a gap of 200 micrometers. The copper foil was placed in a vacuum oven at 80° C. for 3 hours for drying the ink therein, thereby producing a battery precursor having the copper foil and the film serving as a cathode and having a thickness of about 40 micrometers coated thereon.

The resistivity of the film was determined by an instrument for determining resistivity, which has a trade name of K-705RS and which is commercially available from Kyowa Riken. The resistivity of the film was 40 ohm per square centimeter.

The adhesion of the film onto the copper foil was determined by a grid tape test in accordance with Japan Industrial Standard K 5400 8.5.2. The test provided 6 to 8 points, which indicates that the film did not adhere to the tape and that the film adhered to the copper foil.

Hardness of the film having a thickness of 20 micrometers was determined by scrabbling a surface of the film by a pencil having a hardness of 8H in accordance with Japan industrial Standard K 5400 8.4.1. The scrabbling hardly damage the surface of the film. The film was folded along with the copper foil. However, the film neither peel off nor crack. The result shows that the film maintains flexibility, which is critical to manufacturing a lithium battery.

Comparative Example 1

As a comparative example, a battery precursor having the copper foil and the film serving as a cathode coated thereon was produced in the same manner except that carbon nanotubes were replaced by ketjen black, which is commercially available from Akzo.

The resistivity of the film was determined by the same instrument to be 50 kiloohm per square centimeter.

The adhesion of the film was determined by the same grid tape test in accordance with Japan Industrial Standard K 5400 8.5.2, and the test provided 0 point, which indicates that the film peeled off along with the tape from the copper foil.

The scrabbling test of the film having a thickness of 55 micrometers onto the copper foil in accordance with Japan Industrial Standard K 5400 8.4.1 showed that a soft pencil having a hardness of HB damages the surface of the film. The result shows that the film incorporating ketjen black is much softer than the film incorporating carbon nanotubes.

Example 2

Lithium Secondary Battery

A lithium secondary battery having a coin configuration was produced. The aforementioned battery precursor was cut to a disk configuration having a diameter of 16 mm and used as the cathode.

A gel electrolyte was obtained by a method as follows. To a mixture of 14.5 gram of propylene carbonate and 25.1 gram of ethylene carbonate was added 4.8 gram of lithium tetrafluoroborate. A powder of 5.0 gram of a copolymer of polyacrylonitrile and polymethylacrylate, which was commercially available from Scientific Polymer Product and has a weight average molecular weight of 100,000. The mixture thus obtained was stirred by magnetic stirrer for one day to obtain a polymeric dispersion having a white color. The polymeric dispersion was placed in a tray made of stainless steel, and heated to 125 degree Celsius to obtain a colorless dispersion. Meanwhile, onto a glass sheet was placed a pair of TEFLON sheets with a thickness of 0.5 mm at both ends of the glass substrate. The polymeric dispersion, which is colorless and flowable, was added to the glass substrate between the TEFLON sheets. Another glass sheet is placed onto the glass sheet, and the pair of glass sheets were cooled to room temperature. Subsequently, the glass sheets was further cooled in a freezer, and then warmed back to room temperature. The gel film thus obtained was cut in a circular configuration having a diameter of 18 mm.

A foil made of metallic lithium was used as the anode, and the copper foil was used as the anode current collector.

The battery precursor, the gel electrolyte, the anode, and anode current collector were laminated in this order.

The lithium secondary battery having a coin configuration was subject to repeated cycles of discharging and charging. It turned out that the lithium battery maintained more than 90 percent of discharging capacity after 100 cycles of discharging and charging.

An electrode of the present invention has improved electric conductivity and mechanical strength. Compared to other carbon materials, a smaller amount of carbon nanotubes allow to maintain necessary electrical conductance and mechanical strength of the electrode.

A battery precursor of the present invention has improved adhesion to the current collector.

The electrode of the present invention is suitable for a cathode of a lithium battery and particularly a lithium secondary battery. The electrode may be used in a sensor for detecting an electric potential of a medium.

What is claimed is:

1. An electrode comprising:
   an electrically conductive matrix containing a disulfide group, wherein an S—S bond of the disulfide group is cleaved by electrochemical reduction and reformed by electrochemical oxidation; and
   a plurality of carbon nanotubes being substantially disentangled and dispersed in the electrically conductive matrix.

2. An electrode of claim 1 wherein the electrode is substantially free of an aggregate of the carbon nanotubes.

3. An electrode of claim 1 wherein the carbon nanotubes have an average diameter of 3.5 to 200 nanometers and an average length of 0.1 to 500 micrometers.

4. An electrode of claim 1 wherein the carbon nanotubes have an average diameter of 5 to 30 nanometers and an average length of 100 to 10000 times the diameter thereof.

5. An electrode of claim 1 wherein the electrode contains 0.5 to 6 percent by weight of the carbon nanotubes based on a sum of the electrically conductive matrix and the carbon nanotubes.

6. An electrode of claim 1 wherein the electrode contains 1 to 4 percent by weight of the carbon nanotubes based on a sum of the electrically conductive matrix and the carbon nanotubes.

7. An electrode of claim 1 wherein the electrode has a sheet configuration.

8. An electrode of claim 1 wherein the electrically conductive matrix contains an electrically conductive polymer and an organic compound having the disulfide group.

9. An electrode of claim 8 wherein the electrically conductive polymer comprises a polymer represented by a formula:

—[Ar—NH]$_n$— wherein Ar is aryl, and n is an integer.

10. An electrode of claim 8 wherein the organic compound contains a 5 to 7 membered, heterocyclic ring containing 1 to 3 heteroatoms consisting of a nitrogen atom and a sulfur atom.

11. An electrode of claim 1 wherein the electrically conductive matrix contains an electrically conductive polymer having the mercapto group which is capable of forming disulfide group.

12. A lithium battery, comprising:
(a) a cathode comprising the electrode as claimed in claim 1;
(b) an anode having an active material for releasing lithium ions; and
(c) an electrolyte being disposed between the cathode and the anode.

13. A lithium battery of claim 12 wherein the cathode is substantially free of an aggregate of the carbon nanotubes.

14. A lithium battery of claim 12 further comprising:
(d) a cathode current collector contacting with the cathode; and
(e) an anode current collector contacting with the anode.

15. A lithium battery of claim 14 wherein the cathode current collector, the cathode, the electrolyte, the anode, and the anode current collector have a layered structure and are laminated each other in this order.

16. A lithium battery of claim 12 wherein the cathode has a thickness ranging from 5 to 500 micrometers.

17. A lithium battery of claim 12 wherein the cathode has a thickness ranging from 10 to 100 micrometers.

18. A lithium battery of claim 14 wherein the cathode current collector has a sheet configuration.

19. A lithium battery of claim 14 wherein the cathode current collector comprises metallic foil.

20. A lithium battery of claim 12 wherein the carbon nanotubes have an average diameter of 3.5 to 200 nanometers and an average length of 0.1 to 500 micrometers.

21. A lithium battery of claim 12 wherein the cathode contains 0.5 to 6 percent by weight of the carbon nanotubes based on a sum of the electrically conductive matrix and the carbon nanotubes.

22. A lithium battery of claim 12 wherein the electrically conductive matrix contains an electrically conductive polymer and an organic compound having the disulfide group.

23. A lithium battery of claim 22 wherein the electrically conductive polymer comprises a polymer represented by a formula:

wherein Ar is aryl, and n is an integer.

24. A lithium battery of claim 12 wherein the electrically conductive matrix contains an electrically conductive polymer having the disulfide group.

25. A lithium battery of claim 12, wherein the electrolyte comprises at least one of a solid electrolyte and a gel electrolyte.

* * * * *